(12) United States Patent
Lewandowski

(10) Patent No.: US 12,426,743 B2
(45) Date of Patent: Sep. 30, 2025

(54) CHEESE GRATER HOPPERS, APPARATUSES AND METHODS OF USING THE SAME

(71) Applicant: ReddyMade LLC, McHenry, IL (US)

(72) Inventor: Adam Lewandowski, McHenry, IL (US)

(73) Assignee: ReddyMade LLC, McHenry, IL (US)

( * ) Notice: Subject to any disclaimer, the term of this patent is extended or adjusted under 35 U.S.C. 154(b) by 285 days.

(21) Appl. No.: 18/122,239

(22) Filed: Mar. 16, 2023

(65) Prior Publication Data
US 2024/0306853 A1 Sep. 19, 2024

(51) Int. Cl.
*A47J 43/25* (2006.01)
*A01J 27/04* (2006.01)
*B02C 19/20* (2006.01)

(52) U.S. Cl.
CPC ............ *A47J 43/255* (2013.01); *B02C 19/20* (2013.01); *A01J 27/04* (2013.01)

(58) Field of Classification Search
CPC .......... A47J 43/25; A47J 43/255; A01J 27/04; B02C 19/20
See application file for complete search history.

(56) References Cited

U.S. PATENT DOCUMENTS

| | | | | |
|---|---|---|---|---|
| 4,610,398 A | * | 9/1986 | Palazzolo | A47J 43/255 241/278.1 |
| 2010/0294140 A1 | * | 11/2010 | Fontaine | A01J 27/04 99/452 |
| 2013/0105610 A1 | * | 5/2013 | Graham | A47J 43/255 241/93 |

OTHER PUBLICATIONS

Palazzolo Cheese Hog, 'Cheese Hog Options', https://cheesehogmachine.com/machine-options, 2022 (Year: 2022).*
Original Palazzolos Cheese Hog, https://www.instagram.com/reel/CIM7JuSuana/?utm_source=ig_web_copy_link, Nov. 20, 2022 (Year: 2022).*

* cited by examiner

*Primary Examiner* — Jared O Brown
(74) *Attorney, Agent, or Firm* — Scherrer Patent & Trademark Law, P.C.; Stephen T. Scherrer; Monique A. Morneault

(57) ABSTRACT

Industrial cheese grater or shredder hoppers and/or apparatuses comprise, for example, an input aperture for adding cheese for grating or shredding thereof configured to accommodate at least two standard blocks of cheese. Moreover, a safety bar mechanism allows for safe use of the cheese grater or shredder apparatus.

20 Claims, 4 Drawing Sheets

CHEESE GRATER HOPPERS, APPARATUSES AND METHODS OF USING THE SAME

TECHNICAL FIELD

The present invention relates to cheese grater or shredder hoppers and/or apparatuses. Specifically, the invention comprises an input aperture or mouth for adding cheese for grating or shredding thereof able to accommodate at least two standard blocks of cheese. Moreover, the invention comprises a safety bar mechanism to allow for safe use of the cheese grater apparatus.

BACKGROUND

Industrial cheese grater apparatuses are utilized for grating and/or shredding large amounts of cheese blocks and are typically useful in the restaurant and food manufacturing industries. Specifically, for example, restaurants, such as pizza restaurants, generally need large amounts of grated or shredded cheese as an ingredient thereof for making pizzas and other like dishes for customers. In addition, food factories typically require large amounts of grated or shredded cheese for manufacture and production of foods for consumers that are sold by grocery stores and the like. Food making processes may be relatively fast and therefore require the production of grated or shredded cheese quickly in large quantities.

Industrial cheese grating machines typically have an input aperture or a mouth where a user can feed a block or a chunk of cheese. From the mouth, the cheese typically is moved through a neck or path to a grating or shredding mechanism, consisting mainly of one or more rotating blades that may be utilized to grate or shred the block or chunk of cheese.

To aid a block or chunk of cheese in descending through the mouth and neck of the cheese grating or shredding machine, a plunger may be utilized. Specifically, the plunger may have a head in the general shape and size of the input aperture or mouth and may be hingedly-attached to the machine or linearly disposed above the input aperture or mouth such that when the plunger descends, it pushes the block of cheese into the grating or shredding blade. For example, the plunger may be disposed above the input aperture or mouth and descend linearly, either using a linear guide such as a hydraulic or pneumatic press or other like powered plunger or with a lever for manually pressing the blocks of cheese through the input aperture. The plunger may rotate or otherwise move downwardly and the head may descend through the input aperture or mouth. Thus, blocks or chunks of cheese may be pushed or forced into the shredding mechanism using the plunger.

Oftentimes, the amount of cheese that is grated or shredded by an industrial grating machine is insufficient to keep up with the demand for the ingredient in food preparation. Specifically, the input aperture or mouth and neck of prior art cheese grating or shredding apparatuses, as illustrated in FIGS. 1 and 2, are typically sized to accept a single generally standard block of cheese. Typically, cheese grating or shredding apparatuses are sized to accept a relatively standard "deli loaf" cheese block, which can weigh roughly 5-8 pounds and range in size between 3.5 inches by 3.5 inches up to 4.5 inches by 4.5 inches and roughly 10-16 inches long. Indeed, in the industry of cheese grating or shredding apparatuses of similar types, the vast majority of machines are designed to accept a single deli loaf cheese block. Thus, the amount of grated or shredded cheese produced by such a process is typically limited. Grating or shredding cheese blocks that are larger often requires cutting down the cheese blocks to fit within the input apertures. Moreover, the grating or shredding of different types of cheese together is similarly limited in that typical cheese grating or shredding machines cannot accommodate more than one deli loaf cheese block so to shred and mix different types of cheeses together, the cheese blocks must typically be cut down and combined together before sending through the input apertures of the cheese grating or shredding machines.

FIG. 1 illustrates a prior art cheese grating or shredding machine 1 having an input aperture or mouth 2 sized to pass a single relatively standard block of cheese 3 therethrough. As the plunger 4 pushes down on the cheese block 3, the cheese descends to a rotary blade 5 having sharpened cheese grating or shredding holes therein. As illustrated, the input aperture 2 has a length L or a side-to-side dimension of about 4.75 inches and a width W or a front to rear dimension of about 5.85 inches, which is typical for a standard cheese grating apparatus.

A need, therefore, exists for improved industrial cheese grating or shredding apparatuses. Specifically, a need exists for an improved industrial cheese grating or shredding apparatus having relatively wider input apertures or mouths and/or necks to accommodate more than one block of cheese. More specifically, a need exists for improved industrial cheese grating or shredding apparatuses that increases the rate that cheese is grated or shredded than heretofore known.

As the plunger moves from an up position to a down position through the input aperture or mouth and into the neck thereof, a user may constantly feed blocks of cheese into the input aperture or mouth. If the user is not paying attention or times the plunger incorrectly, then the user's hands and/or fingers may be caught by the plunger thereby causing injury and damage to the user's hands or fingers. In extreme situations, the plunger may drive a user's hand into the shredding mechanism causing significant damage and injury.

A need, therefore, exists for improved industrial cheese grating or shredding apparatuses having safety features. Specifically, a need exists for improved industrial cheese grating or shredding apparatuses that automatically stop when a safety feature has been activated. More specifically, a need exists for improved industrial cheese grating or shredding apparatuses that prevent damage to a user's hands or other body parts when the safety feature is activated.

SUMMARY OF THE INVENTION

The present invention relates to cheese grater or shredder hoppers and/or apparatuses. Specifically, the invention comprises an input aperture for adding cheese for grating or shredding thereof able to accommodate at least two standard blocks of cheese. Moreover, the invention comprises a safety bar mechanism to allow for safe use of the cheese grater or shredder apparatus.

To this end, in an embodiment of the present invention, A cheese grater or shredder hopper configured to be disposed on a body comprising a blade configured to rotate and grate or shred blocks of cheese comprising: an input aperture; and a path leading from the input aperture to the blade, wherein the input aperture and the path leading from the input aperture to the blade is sized and shaped to allow two or more standard blocks of cheese to traverse therethrough to the blade, wherein each of the standard blocks of cheese has cross-sectional dimensions of at about least 3.5 inches by about 3.5 inches, In an embodiment, the input aperture comprises a side-to-side dimension of at least about 7 inches.

In an embodiment, the input aperture comprises a front to rear dimension of at least about 3.5 inches.

In an embodiment, the input aperture comprises a side-to-side dimension of between about 7 inches and about 10 inches.

In an embodiment, the input aperture comprises a front to rear dimension of between about 3.5 inches and about 7 inches.

In an embodiment, the cheese grater or shredder hopper further comprises: a plunger comprising a head disposed above the input aperture, wherein the plunger is configured to descend and the head is configured to fit within the input aperture to press the blocks of cheese into the rotating blade.

In an embodiment, the head comprises cross-sectional dimensions sized and shaped to fit within the input aperture.

In an embodiment, the head has a side-to-side dimension of at least about 7 inches.

In an embodiment, the head has a front to rear dimension of at least about 3.5 inches.

In an embodiment, a cheese grater or shredder apparatus is provided. The cheese grater apparatus comprises: the cheese grater or shredder hopper; and a body comprising a rotating blade configured to grate or shred cheese wherein the input aperture and the path are disposed adjacent the rotating blade and an outlet for moving grated or shredded cheese from the body.

In an alternate embodiment of the present invention, a cheese grater or shredder hopper configured to be disposed on a body comprising a blade configured to rotate and grate or shred blocks of cheese is provided. The cheese grater or shredder hopper comprises: an input aperture, wherein the input aperture is configured to receive blocks of cheese and to lead the blocks of cheese to the blade within the body; a plunger comprising a head disposed above the input aperture, wherein the plunger is configured to descend and the head is configured to fit within the input aperture to press the blocks of cheese into the rotating blade; a controller for causing the plunger and the head to move toward the input aperture; and a safety bar disposed near the input aperture, wherein the safety bar is configured to cause the plunger and the head to move away from the input aperture when the safety bar is moved.

In an embodiment, the controller is a button, wherein activating the button causes the plunger and the head to move toward the input aperture.

In an embodiment, the cheese grater or shredder hopper further comprises: a first sensor disposed adjacent the safety bar, wherein the plunger and the head move away from the input aperture when the first sensor is activated by the safety bar.

In an embodiment, the first sensor is configured to activate a first air valve to cause compressed air to flow into a double pilot actuated air valve, which causes the plunger and the head to move away from the input aperture.

In an embodiment, the safety bar is hingedly attached to a plate so that the safety bar may move at least toward the first sensor and contact the first sensor.

In an embodiment, the plunger and the head move toward or away from the input aperture via a pneumatic cylinder.

In an embodiment, the cheese grater or shredder hopper further comprises: a second sensor disposed near the input aperture, wherein the second sensor defines an end of travel of the head such that when the head reaches the end of travel the second sensor is activated to cause the plunger and the head to move away from the input aperture.

In an embodiment, the controller is configured to open an air valve which causes the plunger and the head to move toward the input aperture.

In an embodiment, the cheese grater or shredder hopper further comprises: an air actuated double pilot air valve, wherein the controller is configured to cause compressed air to flow through the air actuated double pilot air valve in a first manner to cause the plunger and the head to move toward the input aperture and further wherein the safety bar is configured to cause compressed air to flow through the air actuated double pilot air valve in a second manner to cause the plunger and the head to move away from the input aperture.

In an embodiment, a cheese grater or shredder apparatus is provided. The cheese grater apparatus comprises: the cheese grater or shredder hopper; and a body comprising a rotating blade configured to grate or shred cheese wherein the input aperture and the path are disposed adjacent the rotating blade and an outlet for moving grated or shredded cheese from the body.

It is, therefore, an advantage and objective of the present invention to provide improved industrial cheese grating or shredding apparatuses.

Specifically, it is an advantage and objective of the present invention to provide improved industrial cheese grating or shredding apparatuses having relatively wider input apertures or mouths and/or necks to accommodate more than one block of cheese.

More specifically, it is an advantage and objective of the present invention to provide improved industrial cheese grating or shredding apparatuses that increases the rate that cheese is grated or shredded than heretofore known.

In addition, it is an advantage and objective of the present invention to provide improved industrial cheese grating or shredding apparatuses having safety features.

Specifically, it is an advantage and objective of the present invention to provide industrial cheese grating or shredding apparatuses that automatically stop when a safety feature has been activated.

More specifically, it is an advantage and objective of the present invention to provide improved industrial cheese grating or shredding apparatuses that prevent damage to a user's hands or other body parts when the safety feature is activated.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to cheese grater hoppers or shredders and/or apparatuses. Specifically, the invention comprises an input aperture for adding cheese for grating or shredding thereof able to accommodate at least two standard blocks of cheese. Moreover, the invention comprises a safety bar mechanism to allow for safe use of the cheese grater or shredder apparatus.

Figure 1:
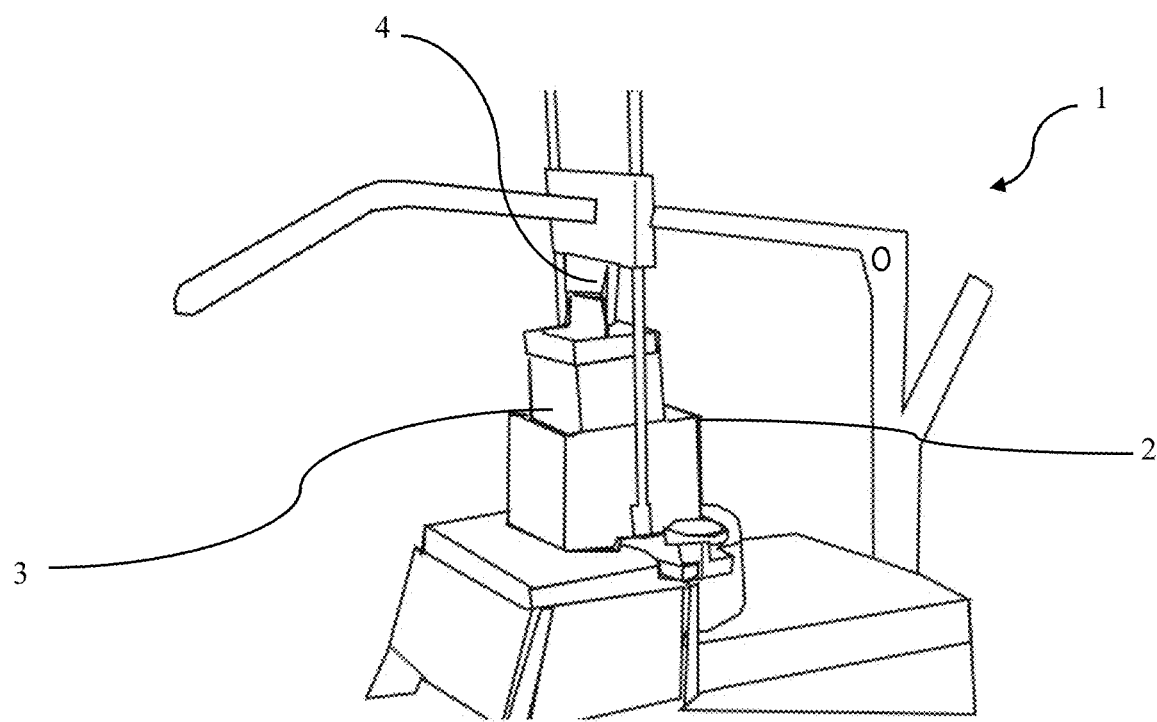
FIG. 1 illustrates a perspective view of a prior art cheese grating or shredding machine having a cheese input aperture configured to accept for grating or shredding a single generally standard block of cheese.
Figure 2:
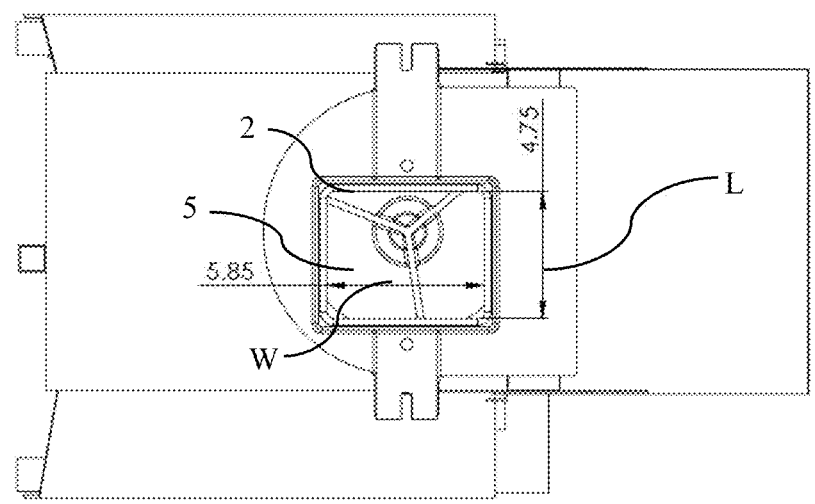
FIG. 2 illustrates a top view of a prior art cheese grating or shredding machine having a cheese input aperture configured to accept for shredding a single generally standard block of cheese.
Figure 3:
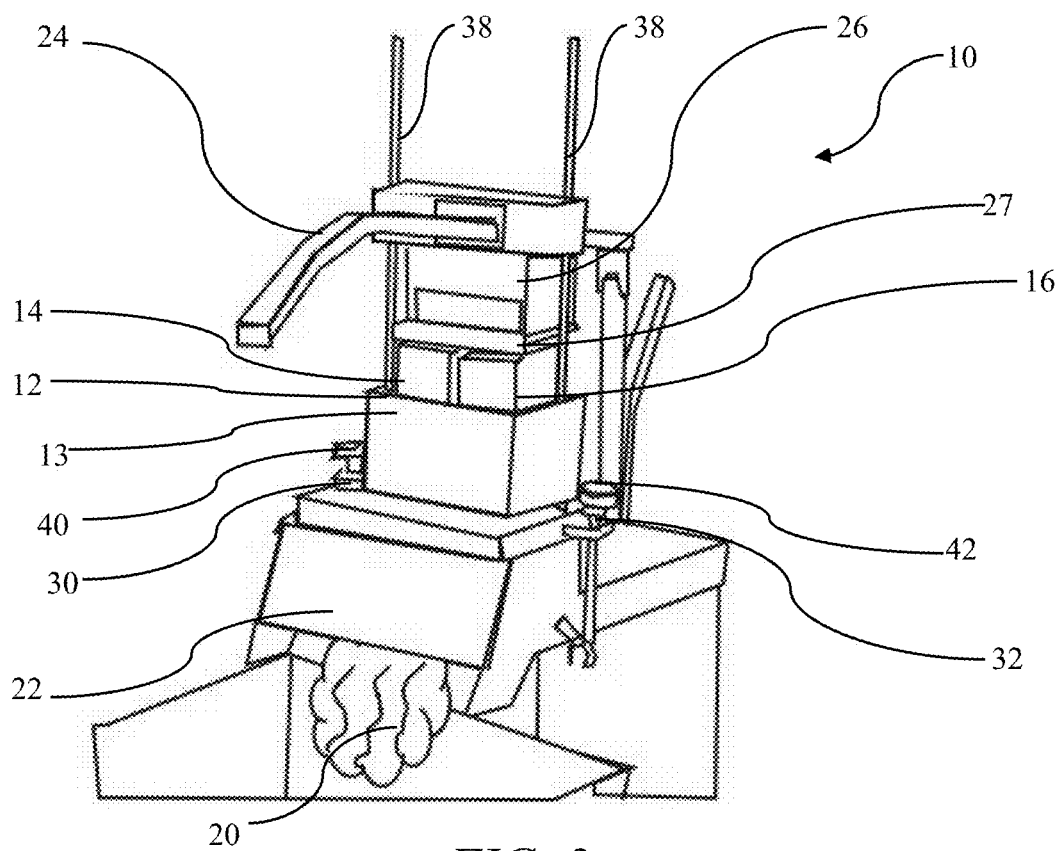
FIG. 3 illustrates a perspective view of a cheese grater or shredder apparatus having a cheese input aperture configured to accept for grating or shredding multiple generally standard blocks of cheese in an embodiment of the present invention.
Figure 4:
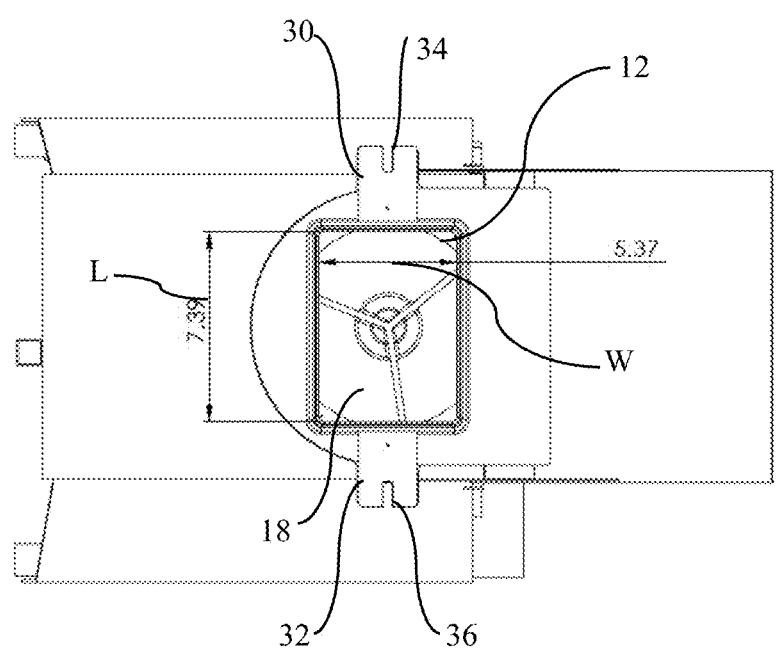
FIG. 4 illustrates a top view of a cheese grater or shredder apparatus having a cheese input aperture configured to accept for shredding multiple generally standard blocks of cheese in an embodiment of the present invention.

FIGS. 3 and 4 illustrates a perspective view and a top view, respectively, of a cheese grater or shredder apparatus 10 in an embodiment of the present invention. Specifically, the cheese grater or shredder apparatus 10 comprises an input aperture 12 for receiving a block of cheese therethrough, that is configured to be sized and shaped to receive therethrough at least two generally standard blocks of cheese 14, 16 therein. The blocks of cheese 14, 16 may be the same type of cheese or may be different types of cheese, in which case the cheese may be grated or shredded and mixed.

FIG. 4 illustrates a grating or shredding blade 18 disposed within the input aperture 12. The grating or shredding blade 18 may have a plurality of sharp bladed holes disposed therein, which may rotate such that when the blocks of cheese 14, 16 are pressed against it while it is rotating, the sharp bladed holes may shred the cheese into grated or shredded cheese 20. The grated or shredded cheese 20 may be ejected through an output chute 22 and collected for use in food making.

As illustrated in FIG. 4, the input aperture 12 may have a size configured to allow two generally standard blocks of cheese to be pressed therethrough. Specifically, in a preferred embodiment, the input aperture 12 may have a length L or a side-to-side dimension of between about 7 and 10 inches and a width W or a front to rear dimension of between about 3.5 and about 7 inches. In a particularly preferred embodiment, the input aperture 12 may have a length L or side-to-side dimension of about 8 inches and a width W or a front to rear dimension of about 5.37 inches.

Disposed on opposite sides of the input aperture 12 may be a pair of extended flanges 30, 32 having slots 34, 36, respectively therein. The flanges 30, 32 may each accept a threaded rod 38, wherein threaded knobs 40, 42 may tighten on the threaded rod 38 above each of the slots 34, 36. The threaded rods 38 may be rigidly held to the side of the apparatus 10 such that when the threaded knobs 40, 42 are tightened on the threaded rods 38 above the slots 34, 36, the input aperture 12 may be rigidly held on the apparatus 10. Therefore, the input aperture 12 may easily be removed, such as for cleaning the same and/or replacing with a differently sized input aperture as needed.

FIG. 3 further illustrates a lever 24 that may manually press a plunger 26, thereby pushing the blocks of cheese 14, 16 through the input aperture 12 so that the blade 14 may grate or shred the blocks of cheese 14, 16. The plunger 26 may have a head 27 that may be sized to generally fit the length L or side-to-side dimension and width W or front to rear dimension of the input aperture 12 so that it pushes all of the blocks of cheese 14, 16 therethrough. It should be noted that the present invention may also be utilized with automatic plungers, such that the plunger may descend and push the blocks of cheese 14, 16 through the input aperture 12 automatically or at the push of a button. Specifically, in a preferred embodiment, the plunger 26 and head 27 may lower and/or raise using a hydraulic or pneumatic press system for pressing the blocks of cheese 14, 16 through the input aperture 12.

Figure 5:
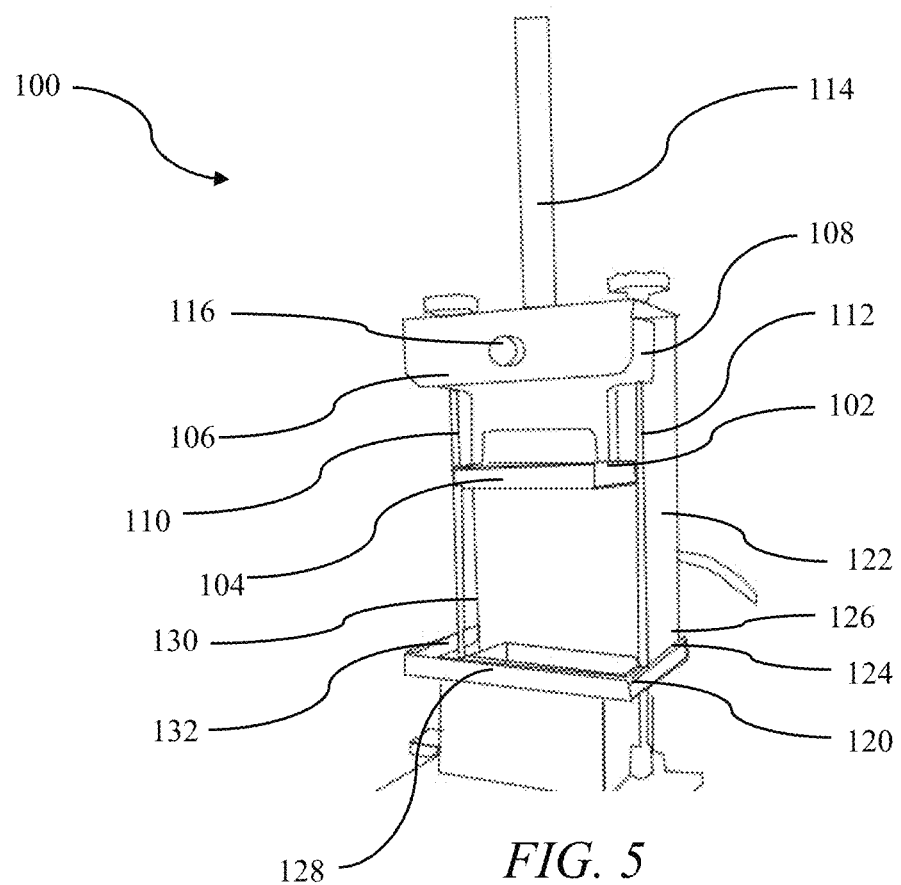
FIG. 5 illustrates a perspective view of a cheese grater or shredder apparatus hopper having a pneumatically driven plunger for pressing cheese blocks into a cheese grater or shredder apparatus and a safety bar in an embodiment of the present invention.

In an alternate embodiment of the present invention, FIG. 5 illustrates a perspective view of a pneumatically driven cheese grater or shredder apparatus hopper 100 for protecting a user's hands as he or she operates a cheese grater or shredder apparatus. Specifically, the cheese grater or shredder apparatus hopper 100 may be disposed on a cheese grater or shredder apparatus (not shown in FIGS. 5 and 6) and may be utilized for pressing cheese blocks into the cheese grater or shredder apparatus using a plunger 102 having a head 104 having a flattened bottom surface for engaging and pressing one or more blocks of cheese into a rotating grating or shredding blade (not shown in FIGS. 5 and 6). The head 104 may further have a pair of shoulders 106, 108 extending outwardly therefrom, through which a pair of vertical rods 110, 112, respectively, is disposed. The head 104 travels upwardly and downwardly and its path is confined by the vertical rods 110, 112 disposed through the shoulders 106, 108, respectively, of the head 104. The plunger 102 may further have a pneumatic cylinder 114 that moves the head 104 upwardly and downwardly, pressing blocks of cheese into the cheese grater or shredder apparatus when moving downwardly from a raised position (illustrated in FIG. 5) and then resetting to the raised position when downward travel is complete. Specifically, pushing a start button 116 may activate the pneumatic cylinder moving the head downwardly until it reaches the end of its travel whereupon it then reverses and rises back to its original position.

The cheese grater or shredder apparatus hopper 100 may further have a safety bar 120 extending from a rear plate 122 in a C-shaped configuration. Specifically, a first arm may 124 may extend from the rear plate 122 on a first side 126 of the hopper 100 and extend forwardly, reaching a bridging member 128 that may extends to an opposite second side 130 of the hopper 100, reaching a second arm 132 which may extend to the rear plate 122 on the opposite second side of the hopper 100. Thus, the safety bar 120 may circumscribe around the sides and the front of the hopper near a hopper entrance aperture 134 disposed at or near a bottom of the hopper 100 where cheese blocks are pressed into the grater apparatus. The safety bar 120 may be hingedly connected to the rear plate 122 so that the safety bar moves upwardly and downwardly due to the hinged connection. In practice, if a user's hand 136 is caught between the head 104 and the safety bar 120, the safety bar 120 may move downwardly and contact a sensor that reverses the cylinder 114, may reverse thereby protecting the user's hand from being damaged or injured by the plunger 102 and/or the head 104.

Figure 7:
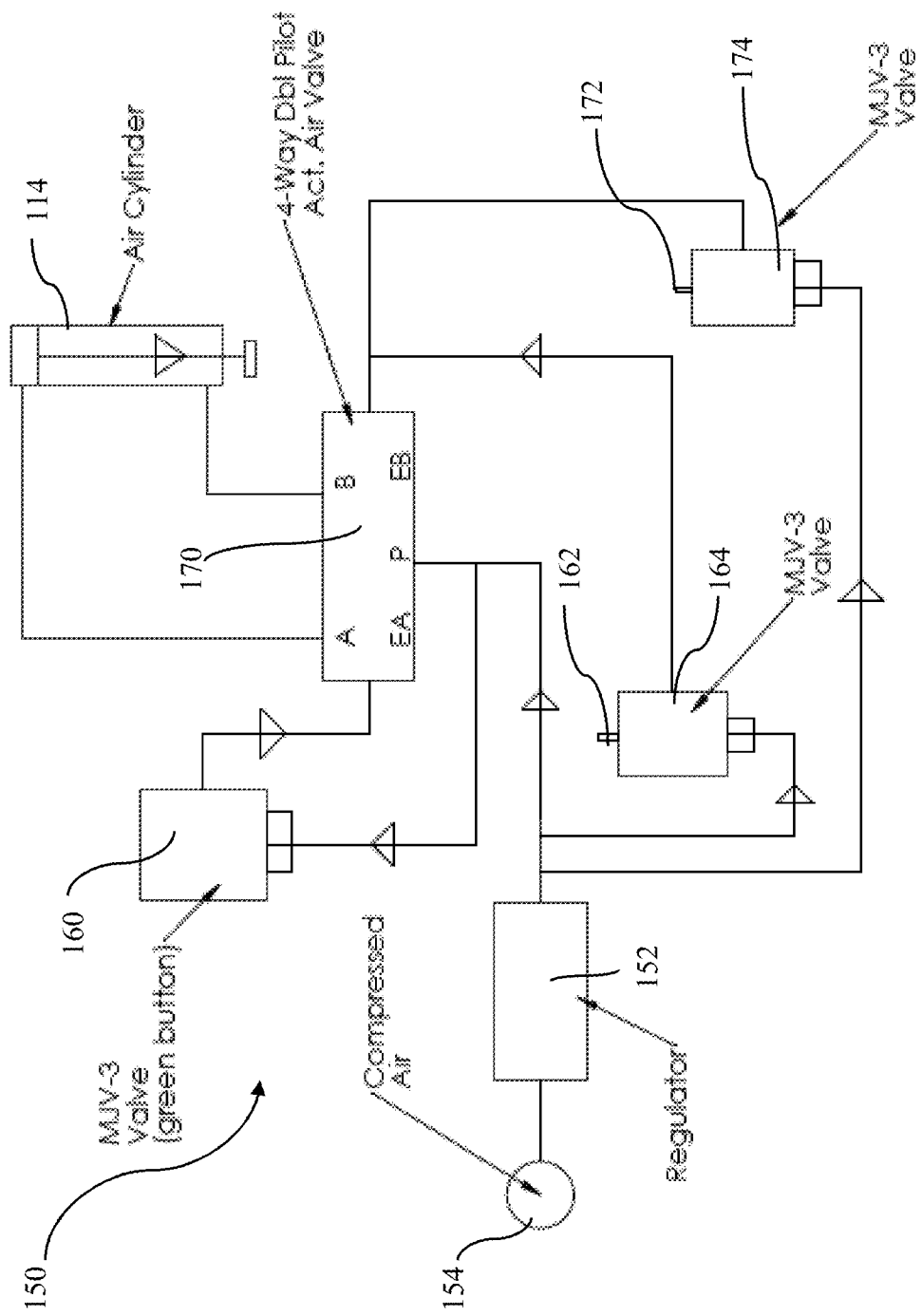
FIG. 7 illustrates an air-flow diagram of a pneumatically-driven plunger and safety mechanism for a cheese grater or shredder hopper or apparatus in an embodiment of the present invention.

FIG. 7 illustrates a pneumatic air flow diagram showing a pneumatic system 150 in an exemplary embodiment of the present invention. Specifically, the pneumatic air flow diagram 150 illustrates the various controls and sensors that may be utilized to control the plunger 102 as it presses cheese blocks through the entrance aperture 134 and into the grater apparatus.

The system 150 may have a regulator 152 for regulating compressed air 154 that may be utilized to charge the system 150 and control the various components thereof. Specifically, when the start button 116 is pressed, it activates first air valve 160 which may allow compressed air 154 to flow from the regulator 152 to the air cylinder 114, thereby moving the cylinder 114 downwardly and, thus, moving the head 104 downwardly. Specifically, the first air valve 160 may actuate a four-way double pilot actuated air valve 170 to allow air flow to the pneumatic cylinder 114 by opening a path of airflow from a "P" port to an "A" port within the four-way double pilot actuated air valve 170, which may then direct compressed air 154 to the cylinder 114 and move the cylinder 114 and the head 104 downwardly, as described above. The compressed air 154 may then travel through the bottom end of the cylinder 114 and exhaust back through the four-way double pilot actuated air valve 170 through a "B" port, which may be exhausted through an "EB" port.

When the head 104 has reached its end of travel, the head 104 or a portion thereof, such as, for example, one of the shoulders 106 or 108, or, preferably, a tab (not shown) on one of the shoulders 106, 108, may activate a first sensor switch 162 which may open the second air valve 164 causing compressed air 154 to flow therethrough into the four-way double pilot actuated air valve 170 thereby switching or actuating the four-way double pilot actuated air valve 170 to cause compressed air to flow through the "P" port and out the "B" port into a bottom end of the air cylinder 114 from the bottom thereof, thereby moving the air cylinder upwards until it reaches its end of travel to a "reset" position. Compressed air 154 may then travel from the air cylinder 114 through the "A" port of the four-way double pilot actuated air valve 170 and exhausted through an "EA" port.

Figure 6:
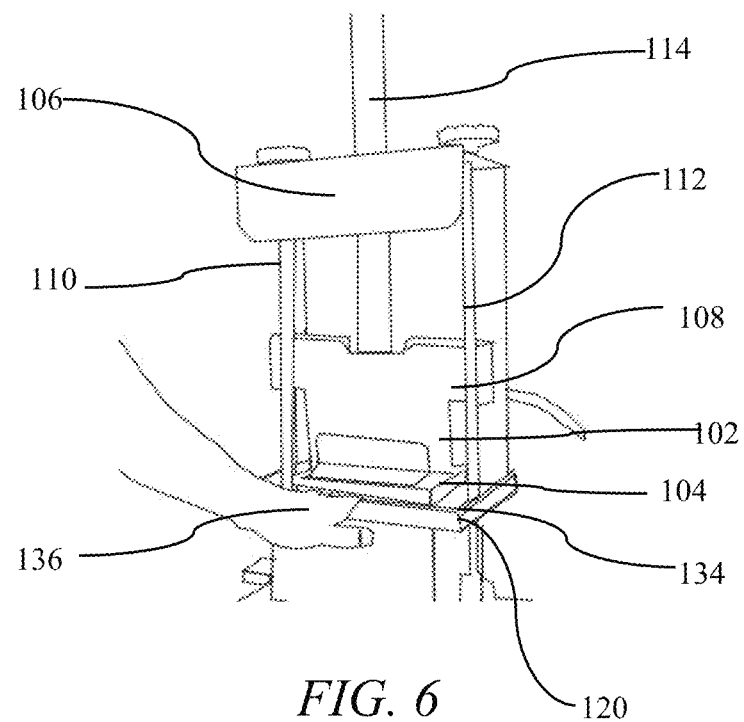
FIG. 6 illustrates a perspective view of a cheese grater or shredder apparatus hopper having a pneumatically driven plunger for pressing cheese blocks into a cheese grater or shredder apparatus and a safety bar engaged to protect a user's hand in an embodiment of the present invention.

In addition to the second air valve 164, which may reverse the cylinder 114 when the head 104 reaches the end of its travel via the cylinder 114, a second sensor switch 172 on a third air valve 174 may be aligned directly beneath the hinged safety bar 120. As described above, in normal operation, the air cylinder 114 moves downwardly when the button 116 is activated, thereby actuating the four-way double pilot actuated air valve 170 to allow air flow from the "P" port through the "A" port and into the top end of the cylinder 114. As illustrated in FIG. 6, if a user places his or her hand or other item between the head 104 as it travels downwardly and the safety bar 120, the safety bar 120 may move downwardly from the impact of the user's hand via the safety bar 120's hinged connection to the rear plate 122 and activate the second sensor switch 172, thereby opening the third air valve 174 and causing compressed air 154 to flow through the third air valve 174 to the four-way double pilot actuated air valve 160, actuating the same to cause the compressed air 154 to switch the air flow and cause the compressed air 154 to flow through the four-way double pilot actuated air valve 170 from the "P" port to the "B" port, through the bottom end of the cylinder 114, causing the cylinder 114 to move the head upwardly to its raised position, and exhausting the compressed air through the "A" port and out the "EA" port. Thus, a user's hand may be protected from becoming injured or damaged if it accidentally is placed beneath the head 104 when the head 104 descends.

The embodiment described herein utilizes compressed air and air flow through the various valves for normal operation and reverse operation of the head. The system 150 described herein is advantageous because it utilizes no electricity or electronics to accomplish. However, it should be noted that the safety system and mechanism described herein may be accomplished in other ways, such as by using electronic sensors and logic to control the normal operation and reverse operation thereof. The present invention should not be limited as described herein.

Moreover, it should be noted that the hoppers and apparatuses described herein are described as being configured for grating and/or shredding cheese but the same may also be utilized with apparatuses that are used for other purposes, such as for slicing vegetables or the like and the present invention should not be limited as described herein.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A cheese grater or shredder hopper configured to be disposed on a body comprising a blade configured to rotate and grate or shred blocks of cheese comprising:
   a plunger comprising a head disposed above the input aperture;
   an input aperture; and
   a path leading from the input aperture to the blade,
   wherein the input aperture and the path leading from the input aperture to the blade is sized and shaped to allow two or more standard blocks of cheese to traverse therethrough to the blade, wherein each of the standard blocks of cheese has cross-sectional dimensions of at least 3.5 inches by 3.5 inches,
   the cheese grater or shredder hopper further comprising a safety bar disposed adjacent the input aperture, wherein the safety bar is configured to cause the plunger and the head to move away from the input aperture when the safety bar is moved.

2. The cheese grater or shredder hopper of claim 1 wherein the input aperture comprises a side-to-side dimension of at least 7 inches.

3. The cheese grater or shredder hopper of claim 1 wherein the input aperture comprises a front to rear dimension of at least 3.5 inches.

4. The cheese grater or shredder hopper of claim 1 wherein the input aperture comprises a side-to-side dimension of between about 7 inches and about 10 inches.

5. The cheese grater or shredder hopper of claim 1 wherein the input aperture comprises a front to rear dimension of between about 3.5 inches and about 7 inches.

6. The cheese grater or shredder hopper of claim 1 further comprising:

wherein the plunger is configured to descend and the head is configured to fit within the input aperture to press the blocks of cheese into the rotating blade.

7. The cheese grater or shredder hopper of claim 1 further comprising a controller for causing the plunger and the head to move toward the input aperture.

8. The cheese grater or shredder hopper of claim 6 wherein the plunger has a side-to-side dimension of at least 7 inches.

9. The cheese grater or shredder hopper of claim 6 wherein the plunger has a front to rear dimension of at least 3.5 inches.

10. A cheese grater or shredder apparatus comprising:
the cheese grater or shredder hopper of claim 1; and
a body comprising a rotating blade configured to grate or shred cheese wherein the input aperture and the path are disposed adjacent the rotating blade, and an outlet for moving grated or shredded cheese from the body.

11. A cheese grater or shredder hopper configured to be disposed on a body comprising a blade configured to rotate and grate or shred blocks of cheese comprising:
an input aperture, wherein the input aperture is configured to receive blocks of cheese and to lead the blocks of cheese to the blade within the body;
a plunger comprising a head disposed above the input aperture, wherein the plunger is configured to descend and the head is configured to fit within the input aperture to press the blocks of cheese into the blade;
a controller for causing the plunger and the head to move toward the input aperture; and
a safety bar disposed adjacent the input aperture, wherein the safety bar is configured to cause the plunger and the head to move away from the input aperture when the safety bar is moved.

12. The cheese or shredder grater hopper of claim 11 wherein the controller is a button, wherein activating the button causes the plunger and the head to move toward the input aperture.

13. The cheese grater or shredder hopper of claim 11 further comprising:
a first sensor disposed adjacent the safety bar, wherein the plunger and the head move away from the input aperture when the first sensor is activated by the safety bar.

14. The cheese grater or shredder hopper of claim 13 wherein the first sensor is configured to activate a first air valve to cause compressed air to flow into a double pilot actuated air valve, which causes the plunger and the head to move away from the input aperture.

15. The cheese grater or shredder hopper of claim 13 wherein the safety bar is hingedly attached to a plate so that the safety bar may move at least toward the first sensor and contact the first sensor.

16. The cheese grater or shredder hopper of claim 11 wherein the plunger and the head move toward or away from the input aperture via a pneumatic cylinder.

17. The cheese grater or shredder hopper of claim 11 further comprising:
a second sensor disposed near the input aperture, wherein the second sensor defines an end of travel of the head such that when the head reaches the end of travel the second sensor is activated to cause the plunger and the head to move away from the input aperture.

18. The cheese grater or shredder hopper of claim 11 wherein the controller is configured to open an air valve which causes the plunger and the head to move toward the input aperture.

19. The cheese grater or shredder hopper of claim 11 further comprising:
an air actuated double pilot air valve, wherein the controller is configured to cause compressed air to flow through the air actuated double pilot air valve in a first manner to cause the plunger and the head to move toward the input aperture and further wherein the safety bar is configured to cause compressed air to flow through the air actuated double pilot air valve in a second manner to cause the plunger and the head to move away from the input aperture.

20. A cheese grater or shredder apparatus comprising:
the cheese grater or shredder hopper of claim 11; and
a body comprising a rotating blade configured to grate or shred cheese wherein the input aperture and the path are disposed adjacent the rotating blade and an outlet for moving grated or shredded cheese from the body.

* * * * *